United States Patent
Inose

(10) Patent No.: US 7,979,476 B2
(45) Date of Patent: Jul. 12, 2011

(54) INFORMATION PROCESSING APPARATUS, CONTROL METHOD THEREFOR, PROGRAM, AND STORAGE MEDIUM

(75) Inventor: Koji Inose, Saitama (JP)

(73) Assignee: Canon Kabushiki Kaisha (JP)

( * ) Notice: Subject to any disclaimer, the term of this patent is extended or adjusted under 35 U.S.C. 154(b) by 483 days.

(21) Appl. No.: 12/026,804

(22) Filed: Feb. 6, 2008

(65) Prior Publication Data

US 2008/0250036 A1    Oct. 9, 2008

(30) Foreign Application Priority Data

Feb. 7, 2007 (JP) ................................. 2007-028273
Feb. 5, 2008 (JP) ................................. 2008-024664

(51) Int. Cl.
*G06F 17/30* (2006.01)
(52) U.S. Cl. ........................................ 707/804; 707/808
(58) Field of Classification Search .................. 707/755, 707/808, 804; 715/234
See application file for complete search history.

(56) References Cited

U.S. PATENT DOCUMENTS

2003/0140308 A1 * 7/2003 Murthy et al. ................ 715/500

FOREIGN PATENT DOCUMENTS

JP    2002-099561 A    4/2002
JP    2002-108665 A    4/2002

OTHER PUBLICATIONS

Quix et al., Generic Schema Mapping, 2007.*
Stylus Studio, Generate XML Schema, Feb. 7, 2005 (accessed Apr. 20, 2010 at http://web.archive.org/web/20050207011153/http://stylusstudio.com/autogen_xsd.html).*
comp.text.xml Newsgroup posting—Jun. 14, 2000.*
Wikipedia, XML Schema (W3C) (retrieved Oct. 8, 2010).*
Kotsakis et al., XML Schema Directory: A Data Structure for XML Data Processing, First International Conference on Web Information Systems Engineering (WISE'00), Proceedings, pp. 62-69, Jun. 19-21, 2000, Hong Kong, China, IEEE CS Press.*
Wrox Programmer Forums, Merging XSD files in one XSD file by using what?, accessed Oct. 8, 2010 at http://p2p.wrox.com/xml/34881-merging-xsd-files-one-xsd-file-using-what.html.*
Data Developer Center, How to obtain final combined xsd schema from XmlSchemaSet.Compile?, accessed Oct. 8, 2010 at http://social.msdn.microsoft.com/Forums/en/xmlandnetfx/thread/74ce7376-4f5e-4dbc-b009-9c1b79672cc1.*

* cited by examiner

*Primary Examiner* — James Trujillo
*Assistant Examiner* — William Spieler
(74) *Attorney, Agent, or Firm* — Rossi, Kimms & McDowell LLP

(57) ABSTRACT

An information processing apparatus which makes it possible to insert data into any form template that is specified. A data input/output control system 104 as the information processing apparatus processes a form template including at least one field into which database data is inserted. An identifier management section 108 extracts identifiable identifiers from identifiers of fields on a plurality of different form templates.

9 Claims, 12 Drawing Sheets

FIG. 4

```
401
<xsd:complexType name="INSURANCE TYPE A">
    <xsd:element name="name" type="xsd:string"/>         402
    <xsd:element name="address" type="xsd:string"/>      403
    <xsd:element name="age" type="xsd:positiveInteger"/> 404
</xsd:complexType>
```

INFORMATION PROCESSING APPARATUS, CONTROL METHOD THEREFOR, PROGRAM, AND STORAGE MEDIUM

BACKGROUND OF THE INVENTION

1. Field of the Invention

The present invention relates to an information processing apparatus, a control method therefor, a program, and a storage medium.

2. Description of the Related Art

There has been an increasing opportunity for forming forms and slips based on data input from a business system that is constructed on the basis of a legacy system and a database system. On the other hand, the business system is often constructed with no attention to the output forms of forms and slips. Further, in general, after constructing a form system that generates forms and slips by using arbitrary data and output forms as inputs, the interface between the business system and the form system is defined for linking the systems.

Specifically, the interface between the systems is realized by a method of associating the identifiers of data of the business system and those of the fields of form templates of the form system.

By the way, the XML (eXtensible Markup Language), which is capable of handling a plurality of data items as a single object together with data structure thereof, has been more often employed as a format of data input to and output from systems. It has been a common practice to define the interface between the systems, particularly, the data output and input between the systems by making use of information (XML schema) of the structure of XML data, specifically by associating element names with each other. It should be noted that the XML schema is defined as "the set of element names for describing arbitrary data".

Japanese Laid-Open Patent Publication (Kokai) No. 2002-108665 discloses as a related art a technique for executing the association of identifiers of user data with the cell numbers of table sheet cells, on a table basis. Further, Japanese Laid-Open Patent Publication (Kokai) No. 2002-99561 discloses a technique for associating the names of XML elements with each other more automatically by using the degree of resemblance of element names as a clue so as to save the trouble of associating them.

Field names are arbitrarily determined by individual users, and generally there are a plurality of form templates that have the same field names. With such a background, it is desired to make the operation of associating the identifiers of data with the field names of form templates as simple as possible.

In the technique disclosed in Japanese Laid-Open Patent Publication (Kokai) No. 2002-108665, it is necessary to associate data identifiers with cell numbers (corresponding to field names of form templates) defined by table sheets on a table sheet basis even if the table sheets have fields with the same names. Consequently, there remains the problem of increased time and labor required for the association.

Further, in the technique disclosed in Japanese Laid-Open Patent Publication (Kokai) No. 2002-99561, it is apparent that as preconditions of making automatic the association between the element names (corresponding to association between the identifiers of data and the field names of form templates), character strings expected to appear as element names are limited. This causes the problem that the technique cannot be applied to cases where character strings expected to appear are determined on a user basis.

SUMMARY OF THE INVENTION

The present invention provides an information processing apparatus which makes it possible to insert data into any form template that is specified, a control method therefor, a program, and a storage medium.

In a first aspect of the present invention, there is provided an information processing apparatus for processing a form template including at least one field into which database data is inserted, comprising a field identifier-extracting unit configured to extract identifiable identifiers from identifiers of fields on a plurality of different form templates.

The information processing apparatus according to the present invention processes a form template including at least one field into which database data is inserted. The information processing apparatus is provided with a field identifier-extracting unit that extracts identifiable ones of identifiers of fields on a plurality of different form templates.

With this configuration, it is possible to insert data into any form template that is specified.

The form templates can each include a plurality of the fields, the fields forming a field identifier group as a different group of identifiers, and the field identifier-extracting unit can extract a field identifier group that can be identified as a set, from the field identifier groups.

As to each of form templates different from the form template to be subjected to extraction, the field identifier-extracting unit can extract identifiers of the field identifier group thereof which are identifiable with identifiers of the field identifier group that can be identified as a set, and the field identifier-extracting unit can determine identifiers of the identifier group of the form template as identifiers to be identified.

The information processing apparatus comprises a display unit configured to display a progress and a result of extraction of the field identifier group using the field identifier-extracting unit.

The information processing apparatus further comprises a generation unit configured to generate from the form templates a plurality of XML schemas containing field names of the form templates, and generate an integrated XML schema by processing the generated XML schemas and identifying common field names.

In a second aspect of the present invention, there is provided a method of controlling an information processing apparatus for processing a form template including at least one field into which database data is inserted, comprising a field identifier-extracting step of extracting identifiable identifiers from identifiers of fields on a plurality of different form templates.

The form templates can each include a plurality of the fields, the fields forming a field identifier group as a different group of identifiers, and the field identifier-extracting step can include extracting a field identifier group that can be identified as a set, from the field identifier groups.

As to each of form templates different from the form template to be subjected to extraction, the field identifier-extracting step can include extracting identifiers of the field identifier group thereof which are identifiable with identifiers of the field identifier group that can be identified as a set, and the field identifier-extracting step can include determining identifiers of the identifier group of the form template as identifiers to be identified.

The method comprises a display step of displaying a progress and a result of extraction of the field identifier group using the field identifier-extracting step.

The method further comprises a generation step of generating from the form templates a plurality of XML schemas containing field names of the form templates, and generating an integrated XML schema by processing the generated XML schemas and identifying common field names.

In a third aspect of the present invention, there is provided a program for causing a computer to execute a method of controlling an information processing apparatus for processing a form template including at least one field into which database data is inserted, comprising a field identifier-extracting step for extracting identifiable identifiers from identifiers of fields on a plurality of different form templates.

In a fourth aspect of the present invention, there is provided a computer-readable storage medium storing a program for causing a computer to execute a method of controlling an information processing apparatus for processing a form template including at least one field into which database data is inserted, wherein the program comprises a field identifier-extracting step for extracting identifiable identifiers from identifiers of fields on a plurality of different form templates.

The features and advantages of the invention will become more apparent from the following detailed description taken in conjunction with the accompanying drawings.

BRIEF DESCRIPTION OF THE DRAWINGS

FIG. 4 is a view of an XML schema obtained from the form template.

DETAILED DESCRIPTION OF THE PREFERRED EMBODIMENTS

The present invention will now be described in detail with reference to the drawings showing a preferred embodiment thereof.

Figure 1:
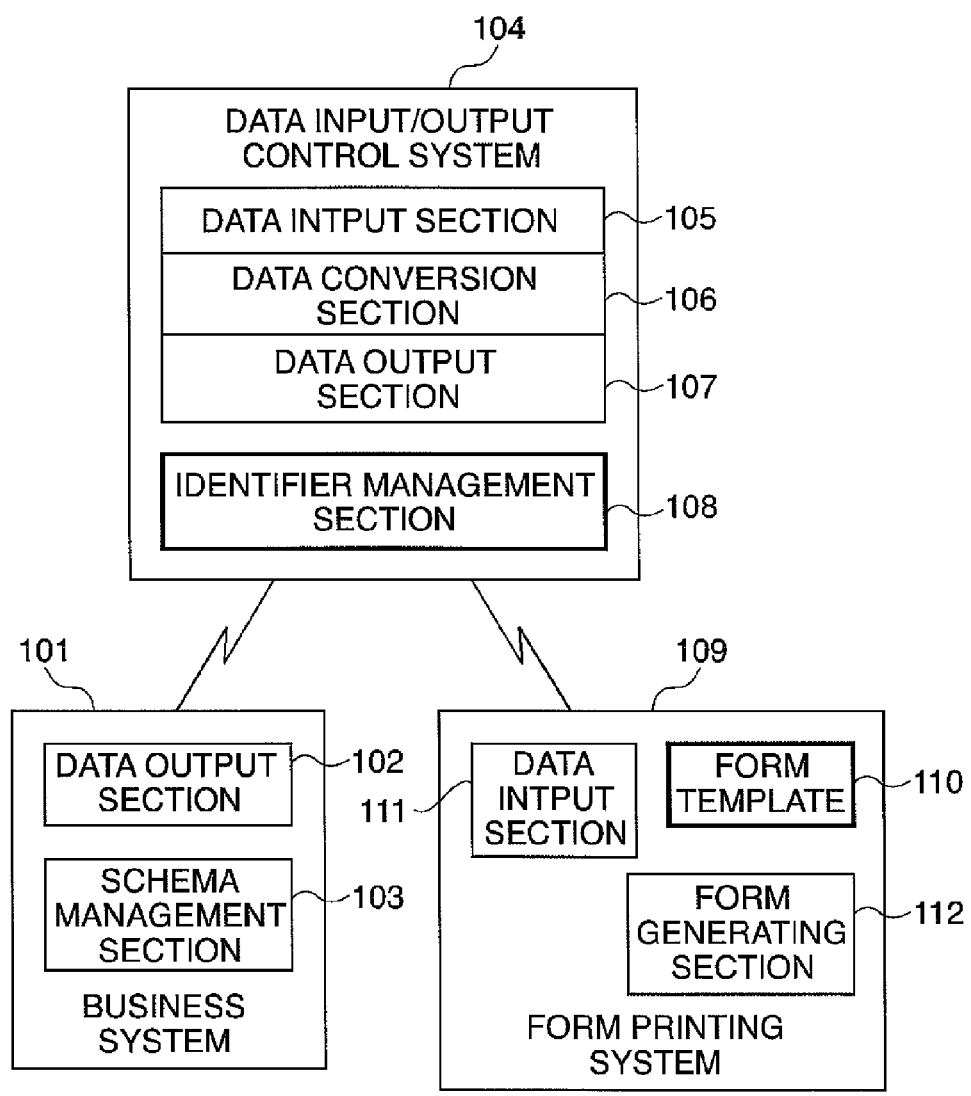
FIG. 1 is a block diagram of a form system including an information processing apparatus according to an embodiment of the present invention.

FIG. 1 is a block diagram of a form system including an information processing apparatus according to an embodiment of the present invention.

Referring to In FIG. 1, the form system is comprised of a business system 101, a form printing system 109, and a data input/output control system 104 for defining an interface between the systems 101 and 109.

The business system 101 includes a data output section 102 and a schema management section 103.

The data input/output control system 104 (information processing apparatus) includes a data input section 105, a data conversion section 106, a date output section 107, and an identifier management section 108.

The form printing system 109 includes a form template 110, a data input section 111, and a form generating section 112.

When the system is designed, the identifier management section 108 associates a field name corresponding to the identifier of a field that the form template 110 has, with the identifier of data obtained from the schema management section 103.

A process for extracting identifiable field names from a plurality of templates, which characterizes the present embodiment, is carried out by the identifier management section 108.

When the system is used, business data output from the data output section 102 is input to the data input section 105, and is converted by the data conversion section 106 using an identifier association rule generated by the identifier management section 108. Then, the business data is input to the data input section 111 of the form printing system 109 via the date output section 107, and is subjected to overlay processing by the form generating section 112 using the form template 110.

Many of the form templates 110 have a common field name, and when expressed in the XML, the field name can be expressed as "the set of names of elements which can be identified between a plurality of different form templates" by using XML schemas.

The XML schema defines the structure of XML data, which does not depend on the values of elements and attributes, that is, the names of elements and names of attributes of XML data, the number of times of appearance and order of appearance of the elements and attributes, and so forth.

In the following, a detailed description will be given of the XML schema.

Figure 2:
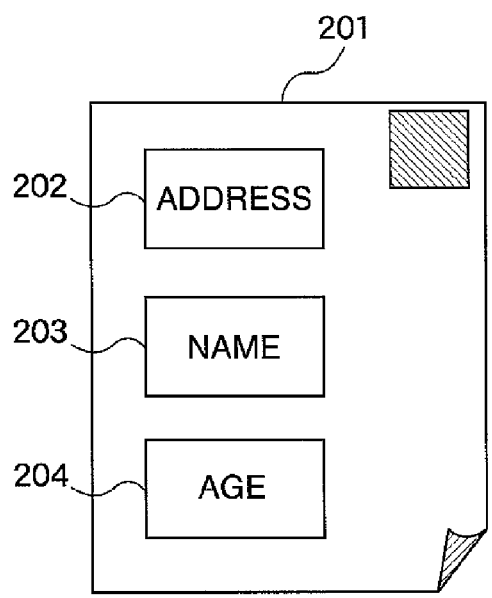
FIG. 2 is a view showing an example of a form template.
Figure 3:
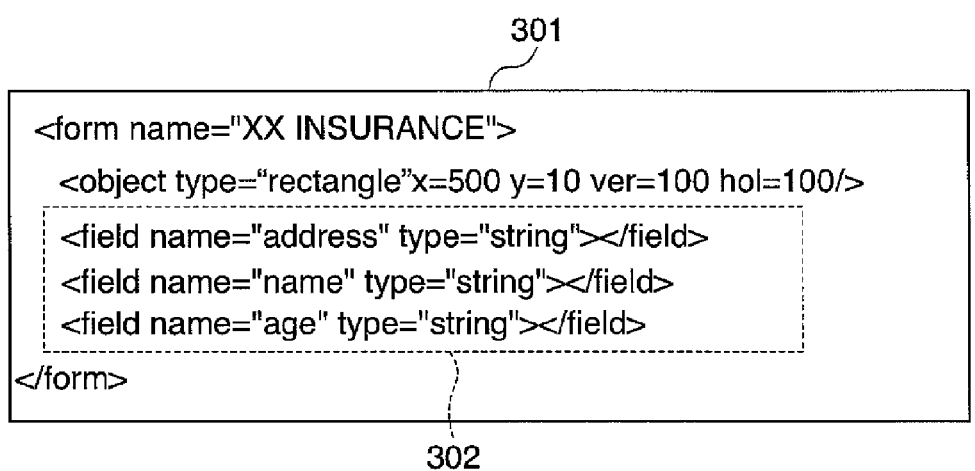
FIG. 3 is a view showing an example of an XML expression of the form template.

FIG. 2 is a view showing the form template appearing in FIG. 1. FIG. 3 is a view showing an XML expression of the form template, while FIG. 4 is a view of a schema expression of field names of the same.

In the form template 201 shown in FIG. 2, reference numerals 202, 203, and 204 designate fields, and have names (field names), respectively. By inserting arbitrary data items associated with the field names into the fields, a desired form is obtained.

In the XML expression 301 shown in FIG. 3, a portion indicated by reference numeral 302 corresponds to the names. The portion 302 defines that the field names are expressed as the values of structured data items, but it is converted into a schema that is meta-level data, for association with other data.

In the schema expression 401 shown in FIG. 4, a portion indicated by reference numeral 402, for example, corresponds to the field indicated by the reference numeral 202 in FIG. 2, and defines that the name of the field is an XML element name. Similarly, a portion indicated by reference numeral 403 corresponds to the field indicated by the reference numeral 203, and a portion indicated by reference numeral 404 to the field indicated by the reference numeral 204.

The schema expression 401 means that there is no order of occurrence of the element names defined by the respective reference numerals 402, 403, and 404. That is, it is expressed that XML schemas corresponding to form templates having the same field names are identical to each other.

Next, a description will be given of a process for extracting identifiable field names or field name groups, i.e. schemas, with reference to FIGS. 5, 6, and 7.

Figure 5:
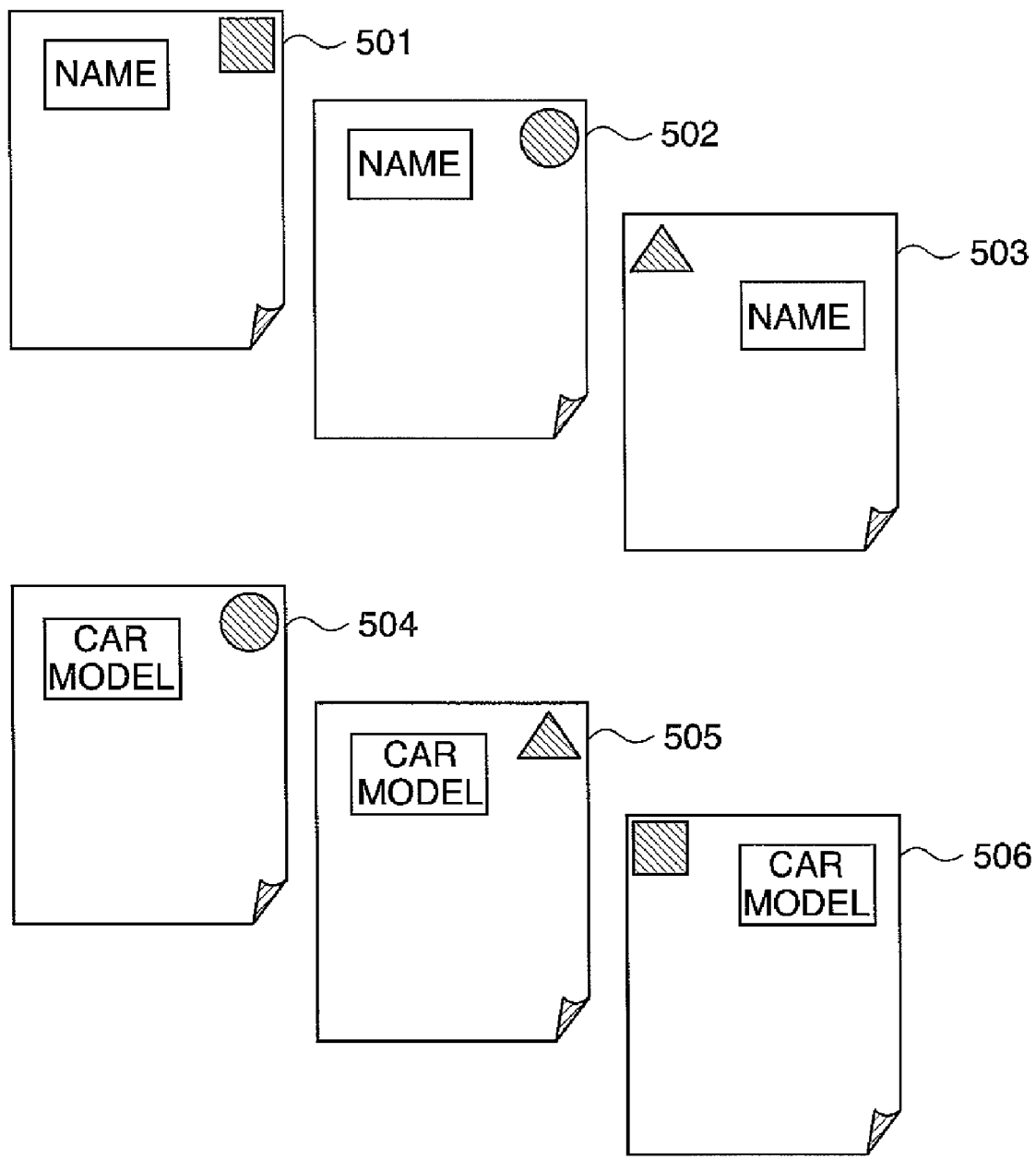
FIG. 5 is a view showing examples of the form template.

FIG. 5 shows examples of specific form templates on which a schema extraction process is performed. Reference numerals 501, 502, and 503 designate form templates each having a single field having the same field name. Similarly, reference numerals 504, 505, and 506 designate form templates each having a single field having the same field name.

As described above, the form templates 501, 502, and 503 are converted into the same schema. Similarly, the form template 504, 505, and 506 are also converted into the same schema.

Figure 6:
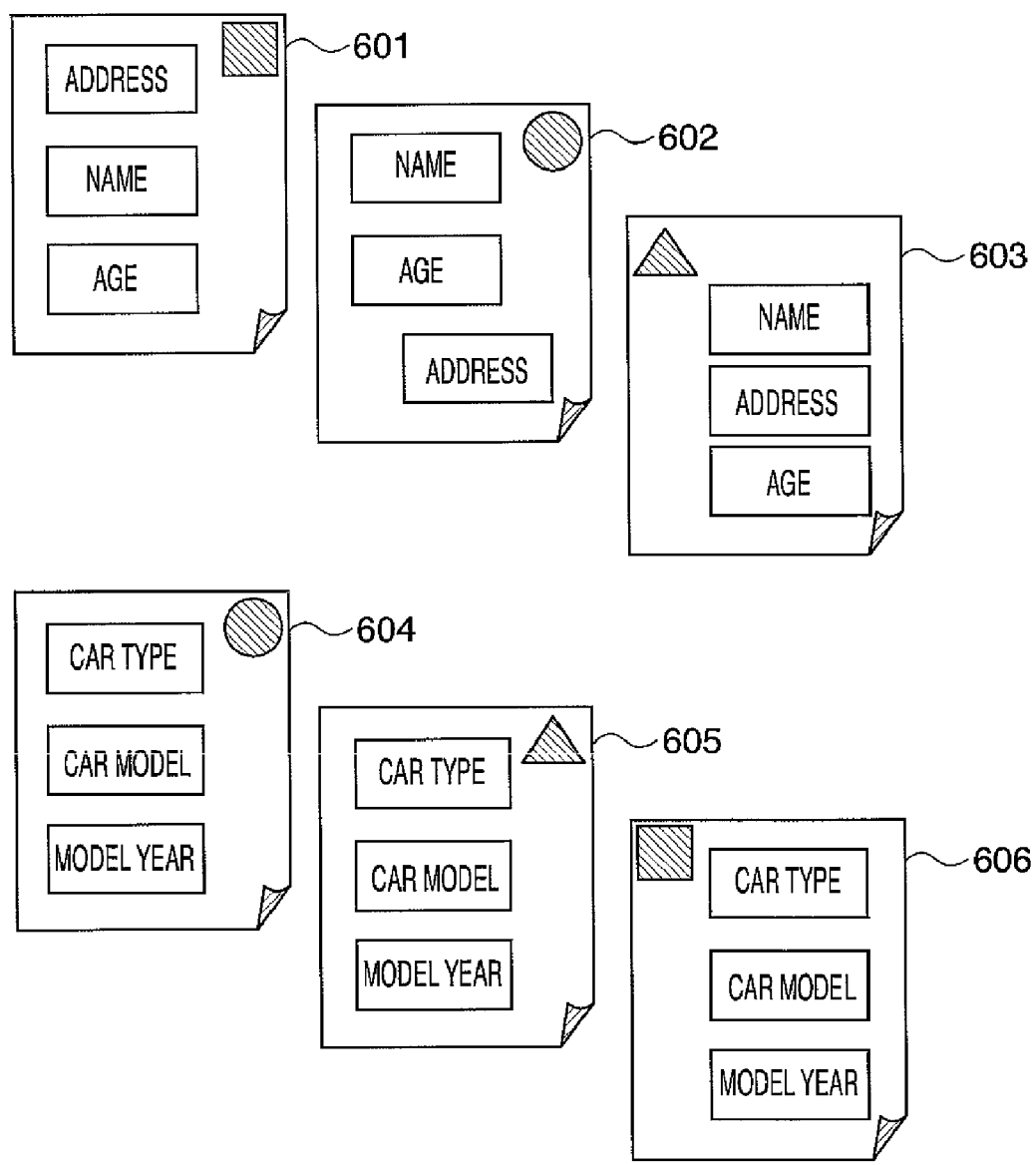
FIG. 6 is a view showing examples of the form template.

FIG. 6 shows other examples of the specific form templates on which the schema extraction process is performed. Reference numerals 601, 602, and 603 designate form templates each having a plurality of fields having the same field names as those of the respective fields of the other form templates. Similarly, reference numerals 604, 605, and 606 designate form templates each having a plurality of fields having the same field names as those of the respective fields of the other form templates.

As described above, the form templates 601, 602, and 603 are converted into the same schema. Similarly, the form templates 604, 605, and 606 are also converted into the same schema.

Figure 7:
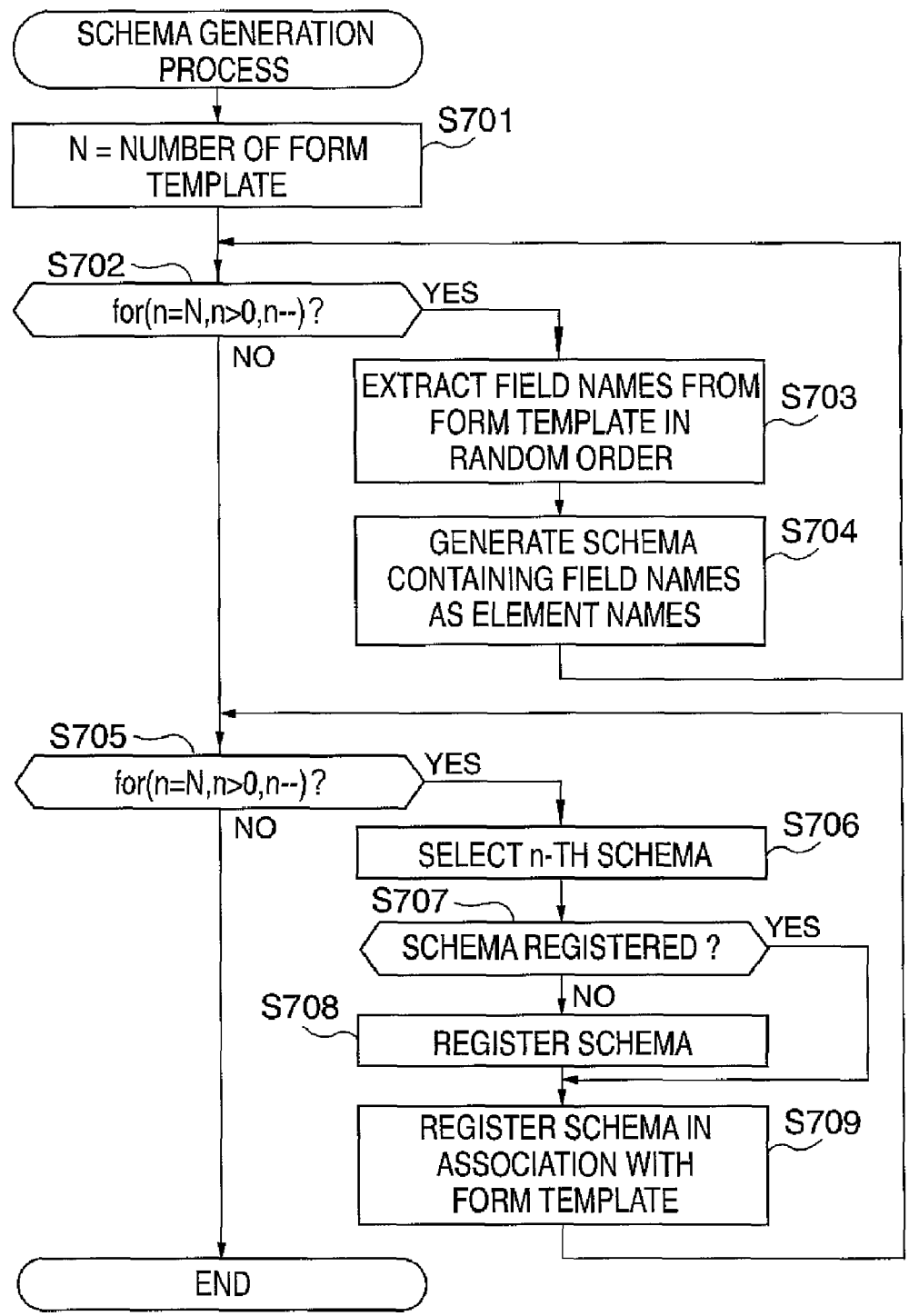
FIG. 7 is a flowchart of a schema generation process executed by the FIG. 1 form system.

FIG. 7 is a flowchart of a schema generation process executed by the form system shown in FIG. 1.

Hereinafter, a description will be given of the schema generation process for generating schema from form templates, with reference to FIG. 7. First, the number of the form templates 110 is held (step S701). Then, the process proceeds to a step S702, wherein the form templates 110 are caused to be processed in the next steps S703 and S704 on a form template-by-form template basis until the number of the form templates 110 having been processed in the steps S703 and S704 reaches the number of the form templates 110 held in the step S701. In the step S703, field names are extracted from the form templates 110, and in the step S704, schemas are generated.

Next, in a step S705, the form templates 110 are caused to be processed in the next steps S706 to S709 on a form template-by-form template basis until the number of the form templates 110 having been processed in the steps S706 to S709 reaches the number of the form templates 110 held in the step S701. In the step S706, an n-th schema is selected from the schemas generated in the step S704, and then, in the step S707, it is determined whether or not the n-th schema has already been registered. If the n-th schema is a new one, it is registered (S708), and is further registered in association with its original form template 110 (S709). This operation is repeated by the number of the form templates 110, i.e. by the number of the schemas generated in the step S704 (S705). When the above process has been terminated, all the registered schemas are different from each other.

It should be noted that in the field name extraction and schema generation processes in the steps S703 and S704, from the form templates, as illustrated in FIG. 5, each of which has a single field having the same field name, schemas defining element names corresponding to the single fields are extracted for generation, and from the form templates, as illustrated in FIG. 6, each of which has a plurality of fields having the same field names as those of the respective fields of the other form templates, schemas defining element names corresponding to the plurality of fields are extracted for generation.

Next, the characteristics of a UI (User Interface) showing the progress and results of extraction of identifiers will be described with reference to FIGS. 8, 9, 10, and 11.

Figure 8:
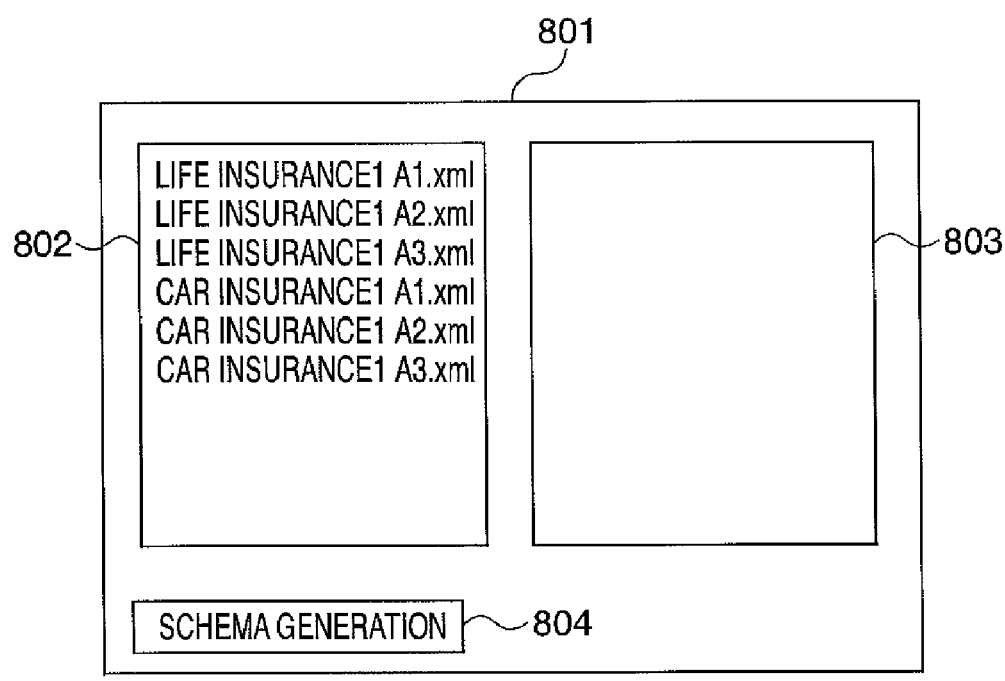
FIG. 8 is a view showing an initial UI for generating a schema.
Figure 9:
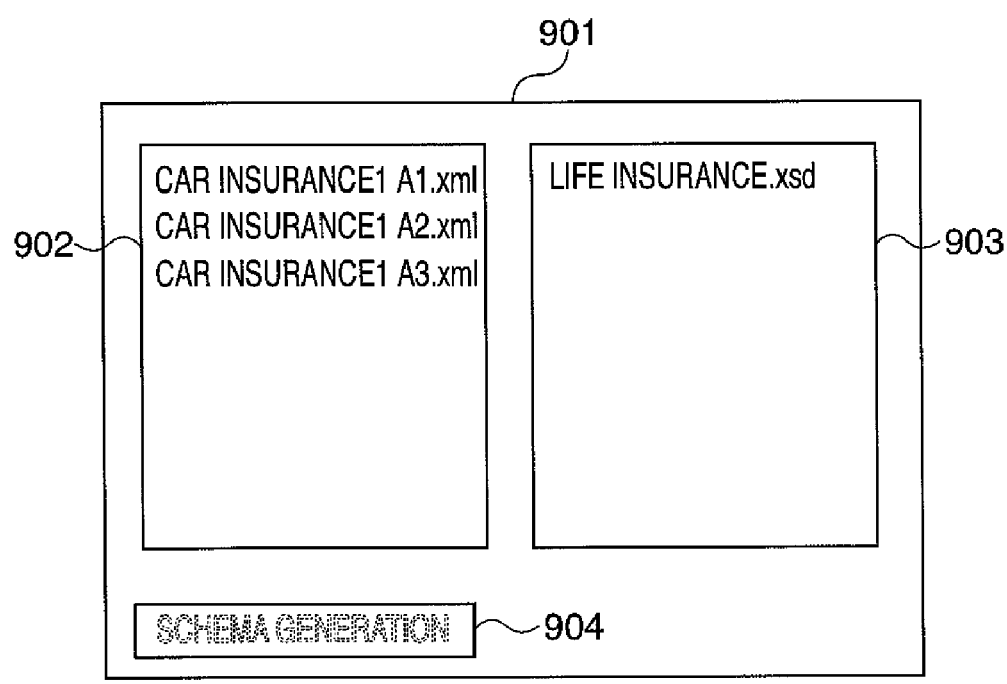
FIG. 9 is a view showing a UI for displaying a progress of generation of a schema.

In FIG. 8, reference numeral 801 designates a screen that displays a stage of the schema generation process immediately before starting the step S705 in FIG. 7. In FIG. 9, reference numeral 901 designates a screen that displays the schema generation process at an arbitrary stage. Reference numerals 802 and 902 designate screens that display form templates, and reference numerals 803 and 903 designate screens that display generated schemas.

At the stage starting the step S705 in FIG. 7, the form templates 110 are not processed yet, all the form templates are displayed, and no schemas are displayed on the screen 803. The process is caused to proceed by giving an instruction for starting the process using a schema generation button 804.

Reference numeral 902 designates a screen on which three upper form templates of the form templates 110 displayed on the screen 803 are deleted after being processed, which means that a schema 903 is generated. A schema generation button 904 is made inactive since the schema generation process is on the way.

Figure 10:
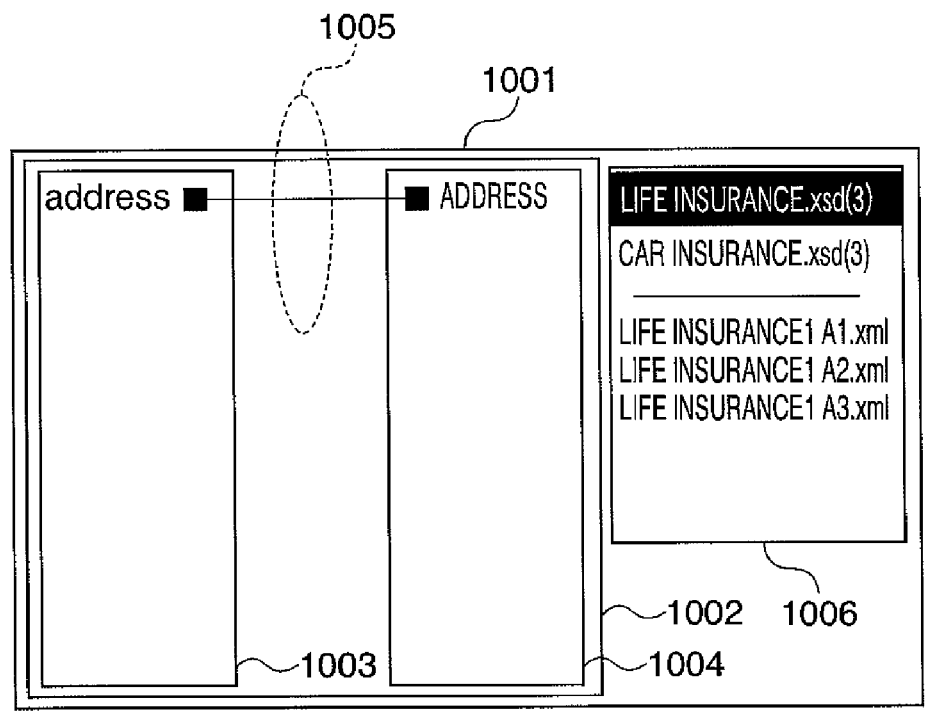
FIG. 10 is a view showing a UI for associating schemas with each other.

Referring to FIG. 10, reference numeral 1001 designates a screen that displays the results of processing all the form templates shown in FIG. 5 by the above-described schema extraction process. Reference numeral 1006 designates an area showing form templates related to the generated schemas and the number of the form templates, and reference numeral 1004 designates an area showing a list of elements forming selected schemas, i.e. field names.

It should be noted that reference numeral 1002 designates a screen associating the elements of schemas of data, i.e. data identifiers (reference numeral 1003) of the business system 101 and the field names (reference numeral 1004) of the form printing system 109, and reference numeral 1005 designates an action for associating the above data identifiers and field names with each other. Although both the association screen and the action are known techniques, they are specially described to make clear the position of the present invention.

Figure 11:
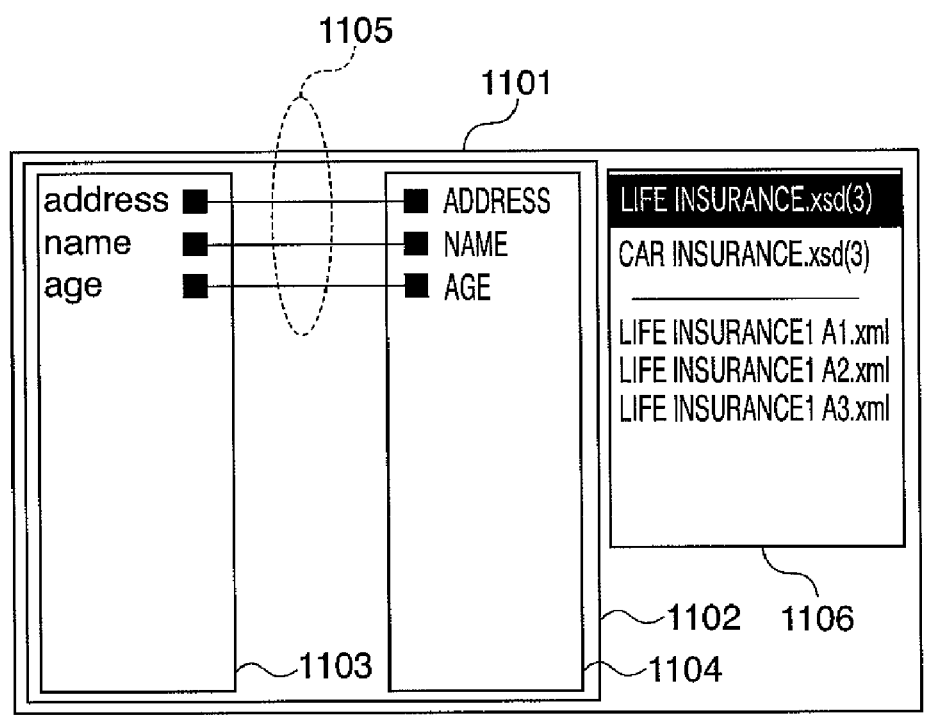
FIG. 11 is a view showing a UI for associating schemas with each other.

In FIG. 11, reference numeral 1101 designates a screen that displays the results of processing all the form templates shown in FIG. 6 by the above-described schema extraction process. Reference numeral 1106 designates an area displaying the form templates 110 related to the generated schemas and the number of the form templates, and reference numeral 1104 designates an area showing a list of elements forming selected schemas, i.e. field names.

It should be noted that reference numeral 1102 designates a screen associating the elements of schemas of data, i.e. data identifiers (reference numeral 1103) of the business system 101 and the field names (reference numeral 1104) of the form printing system 109, and reference numeral 1105 designates an action for associating the above data identifiers and field names with each other.

The position of each field on a form template 110, particularly, the relative position thereof in the case of existence of a plurality of fields is important for generated forms. However, the same field names are sometimes included in different ones of the form templates 110. In this case, to attain the limited object of associating business system data with the fields of the form templates 110, form templates having the same field names are grouped. It provides an effective means for system development to express representative schemas as shown in the areas 1006 and 1106.

Next, a process for integrating schemas will be described. In this process, a situation is assumed in which an arbitrary generated schema, or a schema based on field names of a newly formed form template 110 is integrated with a schema which is already generated but different from the schema. The term "integration" is intended to mean that if schemas match each other in respect of a partial set of elements forming them, i.e. a partial set of field names the schemas are identified as to the partial set.

Figure 12:
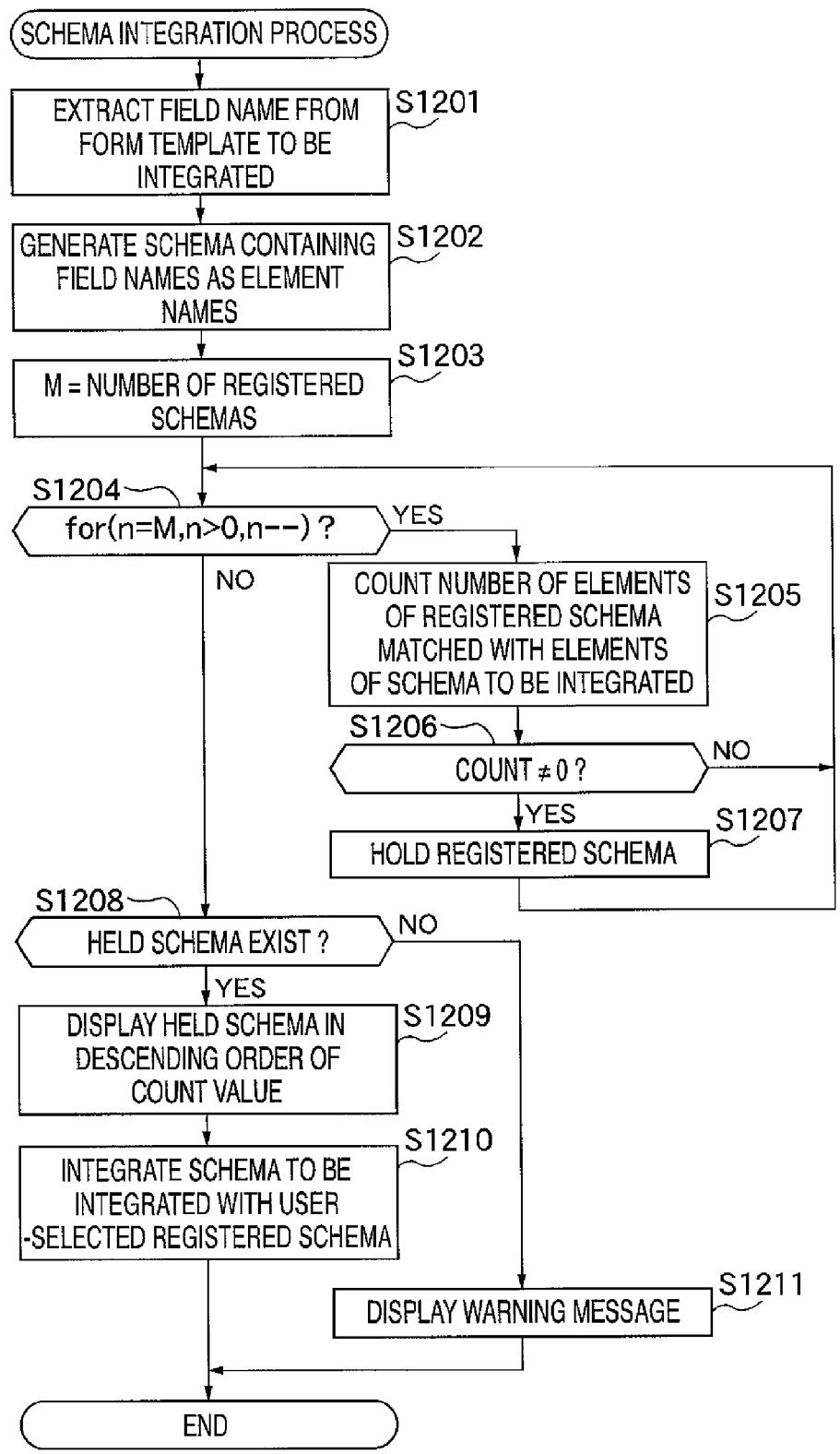
FIG. 12 is a flowchart of a schema integration process executed by the form system shown in FIG. 1.

FIG. 12 is a flowchart of the schema integration process executed by the form system shown in FIG. 1.

In FIG. 12, first, field names are extracted from a form template as an object to be integrated (step S1201), and a schemas is generated (step S1202). When a schema already generated is to be integrated, the steps S1201 and S1202 are omitted. Then, the number M of schemas already registered is calculated and stored (step S1203).

Next, in a step S1204, the schemas already registered are caused to be processed in the next steps S1205 and S1206 on a registered schema-by-registered schema basis until the number of the registered schemas having been processed in the next steps S1205 and S1206 reaches the number of the schemas stored in the step S1203. In the step S1205, the number of matching elements is counted between each registered schema and the schema to be integrated, and if the count is not equal to 0 in the step S1206, and the registered schema is held in association with the value of the count in the step S1207.

Next, the process proceeds to a step S1208, wherein it is determined whether or not any registered schema is held. If no registered schema is held (S1208), it is determined that it is impossible to integrate the schema to be integrated, and a warning message is displayed (S1211), followed by terminating the present process. If any registered schema is held, a list of the held schema(s) is displayed in descending order of the value of the count associated therewith (S1209), for the user to select one which is identified with the schema to be integrated in respect of the matching elements (S1210), followed by terminating the present process.

Figure 13:
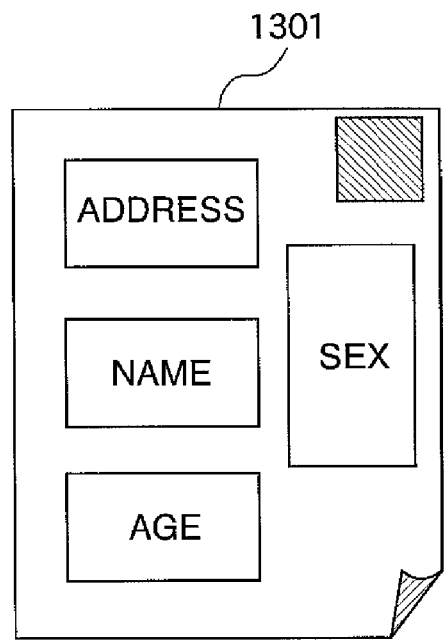
FIG. 13 is a view showing an example of the form template.

A more detailed description will be given of the schema integration process. Now, let it be assumed that a schema based on a form template 1301 (form template 110 in FIG. 1) in FIG. 13 is to be integrated with the registered schema shown in FIG. 11. After the schema is generated from the form template 1301, a schema "LIFE INSURANCE.xsd(1)" is displayed in an area 1405 in FIG. 14.

Figure 15:
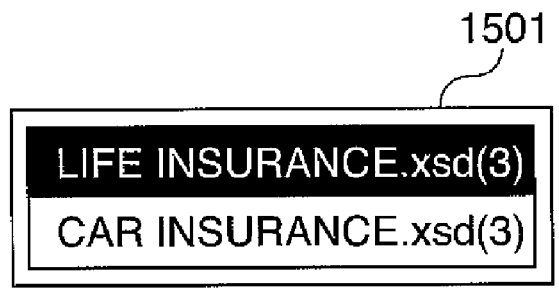
FIG. 15 is a view showing a UI for selecting schemas.

Now, when integration is instructed by an integration button 1406, a list of the schemas 1501 in FIG. 15 is displayed in descending order of the number of the matching elements, and then the integration process is carried out by the user selecting one of the schemas ("LIFE INSURANCE.xsd(3)" in the case of FIG. 15). The result of the integration is shown in FIG. 16, which shows that field names "address", "name" and "age" are identified by completion of the integration.

It should be noted that on an area 1604, a field name "sex" contained in the form template 1301 alone is displayed. This field name makes it possible to newly associate the field name with business data identifiers displayed on an area 1603, and it is possible to select whether or not the field name should be displayed.

Figure 14:
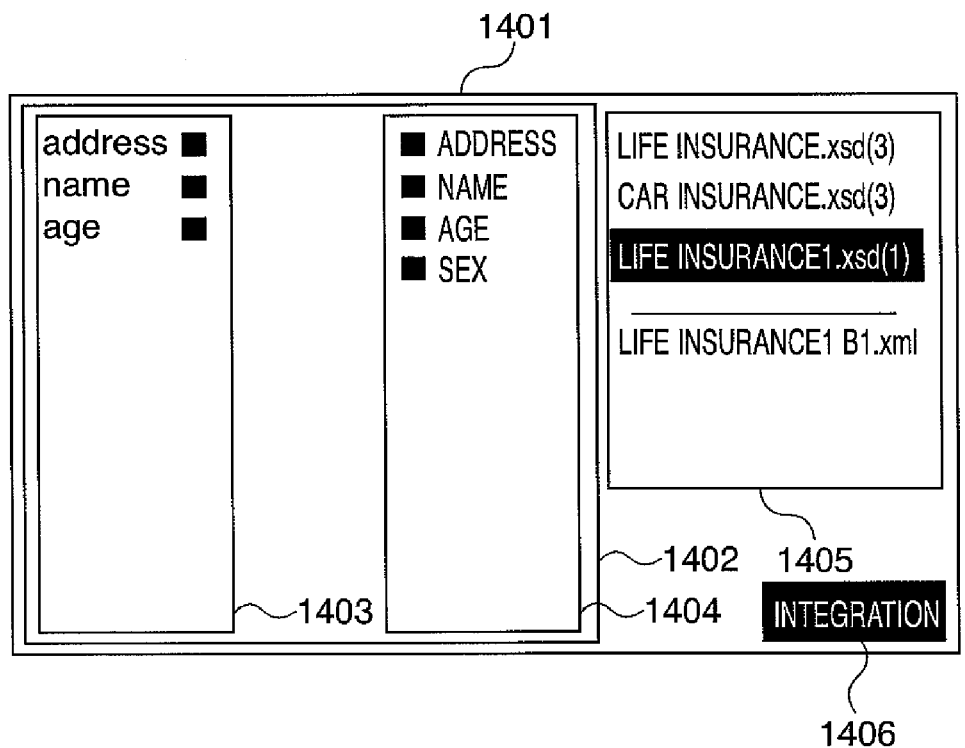
FIG. 14 is a view showing a UI immediately before integration of the schemas.
Figure 16:
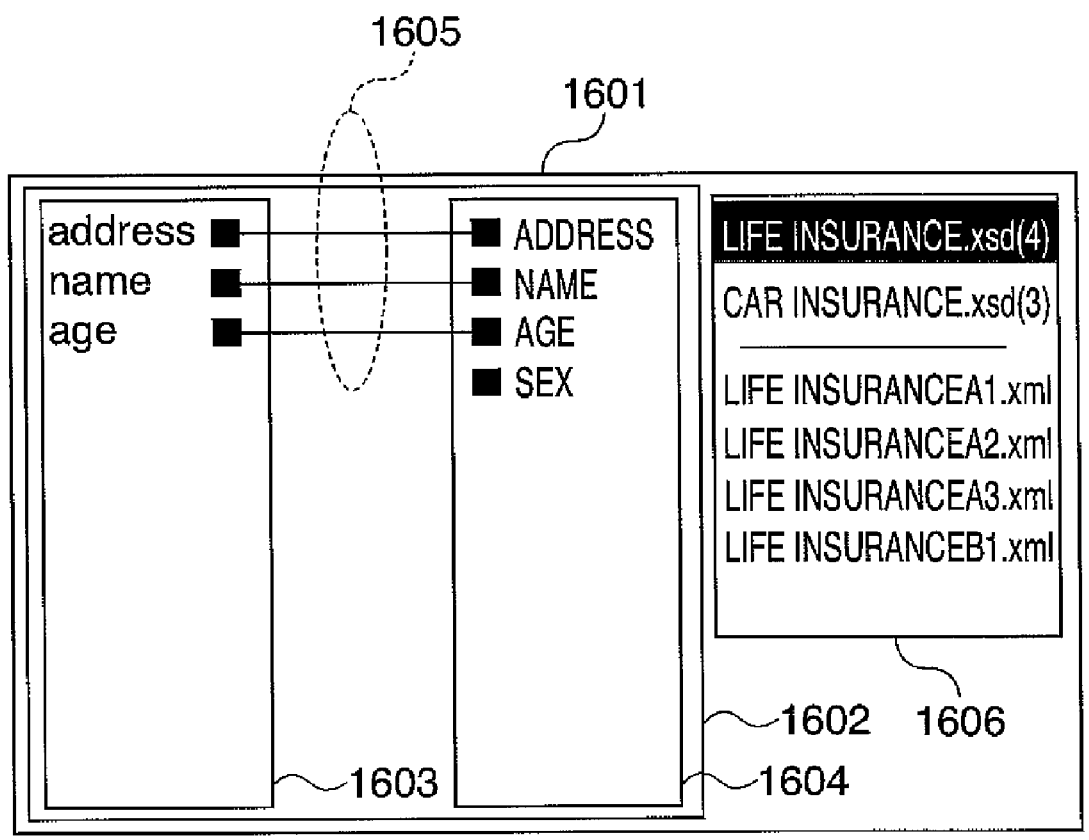
FIG. 16 is a view showing a UI after integration of schemas.

Reference numeral 1402 in FIG. 14, and reference numeral 1602 in FIG. 16 correspond to reference numeral 1102 in FIG. 11. Reference numeral 1403 in FIG. 14, and reference numeral 1603 in FIG. 16 correspond to reference numeral 1103 in FIG. 11. Further, reference numeral 1404 in FIG. 14, and reference numeral 1604 in FIG. 16 correspond to reference numeral 1104 in FIG. 11. Reference numeral 1405 in FIG. 14, and reference numeral 1606 in FIG. 16 correspond to reference numeral 1106 in FIG. 11. Reference numeral 1605 in FIG. 16 corresponds to reference numeral 1105 in FIG. 11.

Figure 17:
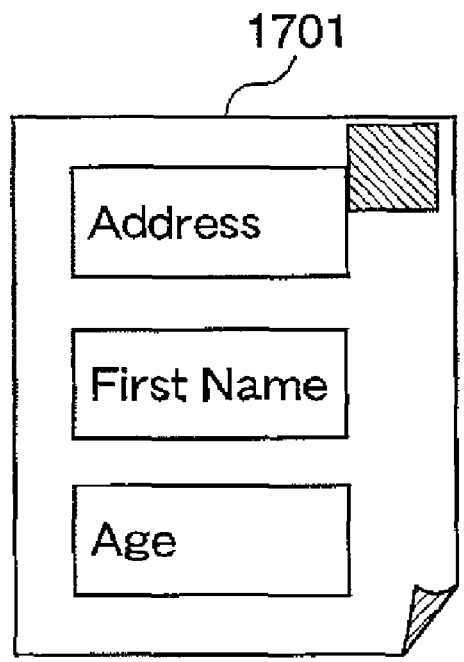
FIG. 17 is a view showing an example of a form template which displays unintegratable schemas.
Figure 18:
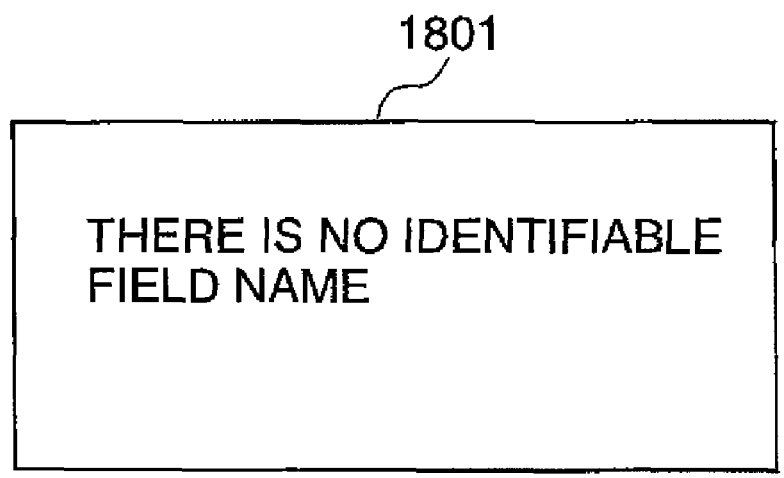
FIG. 18 is a view showing a warning screen displayed when the unintegratable schemas are displayed on the form template.

When a schema based on a form template 1701 shown in FIG. 17 is to be integrated in place of the FIG. 13 form template 1301, and the schema integration process shown in FIG. 12 is carried out, a warning screen 1801 as shown in FIG. 18 is displayed and the integration is not carried out.

It is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, or a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Applications No. 2007-028273 filed Feb. 7, 2007, and No. 2008-024664 filed Feb. 5, 2008, which are hereby incorporated by reference herein in their entirety.

What is claimed is:

1. An information processing apparatus for processing a form template including at least one field into which database data is inserted, comprising:
 a field identifier-extracting unit, including a processor configured to extract identifiable identifiers from identifiers of fields on a plurality of different form templates;
 a generation unit configured to generate from the form templates a plurality of XML schemas containing field names of the form templates and to identify shared field names, the XML schemas each being a set of element names for describing arbitrary data; and a display unit configured to display the plurality of XML schemas having shared field names, wherein the generation unit is further configured to receive an integration selection from a user and to generate an integrated XML schema based on the generated XML schemas, the shared field names, and the user selection.

2. An information processing apparatus as claimed in claim 1, wherein the form templates each include a plurality of the fields, the fields forming a field identifier group as a different group of identifiers, and wherein said field identifier-extracting unit extracts a field identifier group that can be identified as a set, from the field identifier groups.

3. An information processing apparatus as claimed in claim 2, wherein as to each of form templates different from the form template to be subjected to extraction, said field identifier-extracting unit extracts identifiers of the field identifier group thereof which are identifiable with identifiers of the field identifier group that can be identified as a set, and said field identifier-extracting unit determines identifiers of the identifier group of the form template as identifiers to be identified.

4. An information processing apparatus as claimed in claim 2, the display unit further configured to display a progress and a result of extraction of the field identifier group using said field identifier extracting unit.

5. A method of controlling an information processing apparatus for processing a form template including at least one field into which database data is inserted, comprising:

a field identifier-extracting step of extracting identifiable identifiers from identifiers of fields on a plurality of different form templates;

a generation step of generating from the form templates a plurality of XML schemas containing field names of the form templates and identifying shared field names, the XML schemas each being a set of element names for describing arbitrary data;

a display step of displaying the plurality of XML schemas having shared field names; and a receiving step of receiving an integration selection from a user and generating an integrated XML schema based on the generated XML schemas, the shared field names, and the user selection.

6. A method as claimed in claim 5, wherein the form templates each include a plurality of the fields, the fields forming a field identifier group as a different group of identifiers, and wherein said field identifier-extracting step includes extracting a field identifier group that can be identified as a set, from the field identifier groups.

7. A method as claimed in claim 5, wherein as to each of form templates different from the form template to be subjected to extraction, said field identifier-extracting step includes extracting identifiers of the field identifier group thereof which are identifiable with identifiers of the field identifier group that can be identified as a set, and said field identifier-extracting step includes determining identifiers of the identifier group of the form template as identifiers to be identified.

8. A method as claimed in claim 6, further comprising a progress display step of displaying a progress and a result of extraction of the field identifier group using said field identifier-extracting step.

9. A non-transitory computer-readable storage medium storing a program that when executed by a computer causes the computer to execute a method of controlling an information processing apparatus for processing a form template including at least one field into which database data is inserted, wherein the method comprises:

a field identifier extracting step for extracting identifiable identifiers from identifiers of fields on a plurality of different form templates;

a generation step of generating from the form templates a plurality of XML schemas containing field names of the form templates and identifying shared field names, the XML schemas each being a set of element names for describing arbitrary data;

a display step of displaying the plurality of XML schemas having shared field names; and a receiving step of receiving an integration selection from a user and generating an integrated XML schema based on the generated XML schemas, the shared field names, and the user selection.

* * * * *